No. 795,652. PATENTED JULY 25, 1905.
F. A. RUFF.
VEHICLE TIRE.
APPLICATION FILED AUG. 23, 1904.
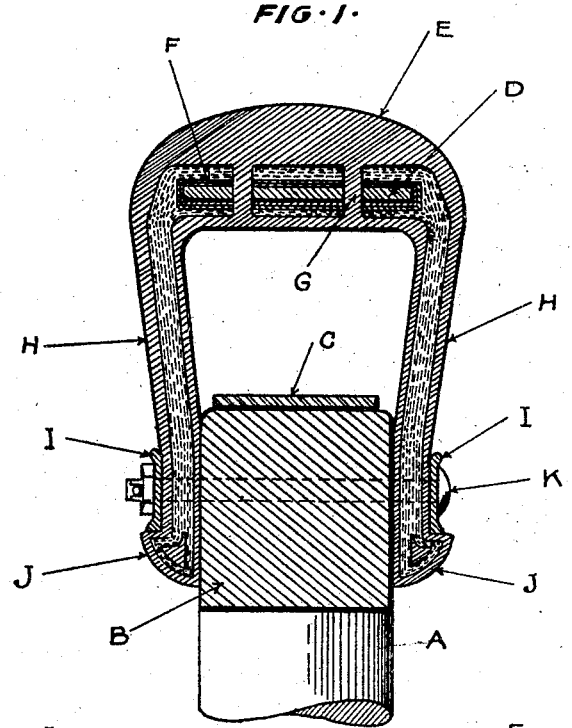
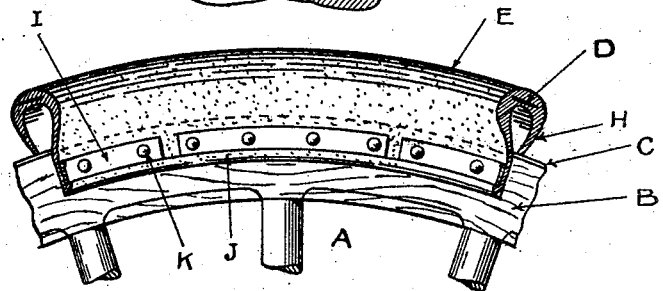
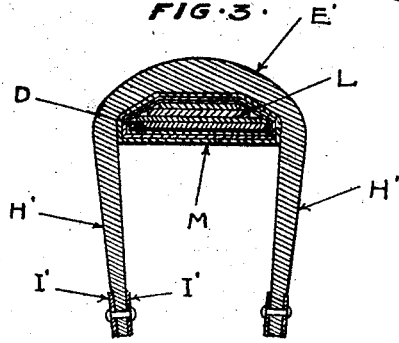
WITNESSES
INVENTOR
FREDERICK A. RUFF.
BY
ATTY

UNITED STATES PATENT OFFICE.

FREDERICK A. RUFF, OF DETROIT, MICHIGAN.

VEHICLE-TIRE.

No. 795,652.  Specification of Letters Patent.  Patented July 25, 1905.

Application filed August 23, 1904. Serial No. 221,871.

*To all whom it may concern:*

Be it known that I, FREDERICK A. RUFF, a citizen of the United States, residing at Detroit, in the county of Wayne and State of Michigan, have invented certain new and useful Improvements in Vehicle-Tires, of which the following is a specification, reference being had therein to the accompanying drawings.

The invention relates to vehicle-tires, and is more particularly designed for use on heavy road-vehicles, such as automobiles.

It is the object of the invention to obtain a resilient tire and to avoid the difficulties and defects of the pneumatic tire commonly used.

In the present state of the art pneumatic tires are commonly used on road motor-vehicles. They are, however, a constant source of annoyance, due to the frequency of punctures and to the difficulty and delay in repairing the same. It is, however, highly important that the tire used on such a vehicle should be resilient, and consequently solid tires or even cushion rubber tires have not proven satisfactory. With my improved construction I retain the resiliency and do away with the necessity of air inflation.

It is one of the objects of my invention to obtain a construction which will permit of employing the old cases for pneumatic tires, which while no longer air-tight are nevertheless serviceable for road use on a non-inflated tire.

It is a further object to obtain a construction which may be more cheaply built than pneumatic tires and which at the same time will be more serviceable and, as above stated, will avoid the objections common to pneumatic tires.

In the drawings, Figure 1 is a cross-section through my improved tire, showing the same as secured to the rim of the vehicle-wheel. Fig. 2 is a similar view illustrating the construction in which the case of the pneumatic tire is employed in connection with my improved construction. Fig. 3 is a side elevation of a section of the tire, illustrating the manner of securing the same to the rim.

A is the vehicle-wheel, and B is the felly or rim thereof. As shown, this rim is of rectangular cross-section and is preferably formed of wood, being provided with a peripheral band C for imparting to it the necessary strength.

My improved construction of tire comprises, essentially, a resilient annular metallic band D, which is of greater diameter than the wheel-rim B, so that when arranged thereabout there will be an annular space between. In the construction shown in Fig. 1 this band D is illustrated as embedded in the case E, the tread portion of which may be similar in construction to that usually employed for pneumatic tires. The band D may be firmly secured within the case E by first wrapping it with a friction-tape, as at F, and also by preferably providing a series of apertures G, through which the rubber of the tire-case may pass to form connecting-staves. The sides of the case E are formed by webs H, which may be suitably constructed, so as to possess the necessary strength for firmly securing the band D to the rim of the vehicle-wheel and also to sustain the load that is placed upon said rim. The webs H are preferably attached to the rim by providing a series of segmental plates I, secured adjacent to the inner edges of the web and adapted to embrace opposite sides of the rim. As shown in Fig. 1, these segmental plates I bear with their lower edges against the shoulder J, which is formed integral with the web H. The segments I may be secured to the rim by suitable means, such as the bolts K, which pass transversely through the rim.

It is essential that the webs H be placed under sufficient tension to hold the rim D in position when under the load placed upon the vehicle-wheel. This may be accomplished by successively attaching the segment I to the rim after the segments on one side of the wheel have been secured. Those on the opposite side may be fastened by first drawing the case and the rim D toward the rim B of the wheel by any suitable tool, so that when all the plates are secured the webs H will be under tension.

With the tire constructed and arranged as described in operation the load on the wheel will cause the flexing of the rim D. This flexing is, however, resisted first by the resiliency of the band itself, and, secondly, by the tension of the webs H, the result being that the flexure will only be sufficient to impart the desired resiliency to the tire. This resiliency is produced, as in the case of the pneumatic tire, by the tendency of the tire to assume a true circular shape as soon as relieved from load. At the same time the load is supported entirely by the mechanical parts without the assistance of the pneumatic cushion.

In the construction shown in Fig. 2 I have adapted my improvement to be used with old pneumatic-tire cases. In this construction the band D has placed around its periphery a series of bands or tapes L, of rubber or fabric, said bands being of progressively-lesser width, so as to form a convex cushion on the periphery of the band D. These parts may be then securely bound together by a wrapping of tape M. The case E' may be any of the ordinary constructions of pneumatic-tire cases, and when a tubular tire is employed it is cut at the center to form separated web-sections H'. To these web-sections the segmental plates I' may be attached by riveting or any other suitable way and the plates secured to the rim B in the manner previously described. With this construction an old pneumatic tire which is no longer air-tight may be quickly converted for use in my non-inflated tire.

What I claim as my invention is—

1. The combination with a vehicle-rim, of a tire therefor comprising a resilient annular band adapted to surround said rim and to be spaced therefrom, a case comprising a central tread portion in which said annular band is embedded surrounding said rim and separated side web portions and means for tensioning and securing the inner edges of said web portions to said rim.

2. A non-inflated resilient tire for vehicles, comprising an annular resilient metallic band of greater diameter than the rim of the wheel, a case having a central tread portion in which said band is embedded and separate side web portions, and a plurality of securing devices at the inner edges of said web, adapted to be successively attached to the rim of the wheel and simultaneously tension the adjacent web portion.

3. The combination with a rim or felly of a vehicle-wheel, of a tire comprising an annular resilient, metallic band of greater diameter than said rim, so as to be spaced therefrom when arranged thereabout, a case having a central tread portion surrounding said band, separated side web portions having outwardly-projecting annular shoulders at their inner edges and a series of segmental plates at the inner edges of said web portions and means for clamping said segmental plates to the rim of the wheel.

4. A non-inflatable resilient tire comprising a resilient annular metallic band, a case having a central tread portion in which said band is embedded, separated side web portions and means for securing the inner edges of said web portions to the rim of the wheel, and perforations in said annular metallic band through which project portions of said case, for the purpose described.

5. A non-inflatable resilient tire, comprising a resilient annular metallic band, and a case having a central tread portion in which said band is embedded, separated side web portions, and an outwardly-projecting annular bead or shoulder at the inner edge of said web portions, and a plurality of separate segmental securing-plates attached to said web portion and bearing against said annular shoulder portion.

In testimony whereof I affix my signature in presence of two witnesses.

FREDERICK A. RUFF.

Witnesses:
H. C. SMITH,
E. D. AULT.